United States Patent [19]

Glover et al.

[11] Patent Number: 4,744,741

[45] Date of Patent: May 17, 1988

[54] APPARATUS FOR THE MANUFACTURE OF COMPOSITE ARTICLES USING ROTATING MOLDS

[75] Inventors: John B. Glover, Huddersfield; Ronald A. Ireland, Lichfield; Colin Adie, Handsacre, Nr. Rugeley, all of Great Britain

[73] Assignee: The Hepworth Iron Company Limited, Stockbridge, England

[21] Appl. No.: 882,237

[22] Filed: Jul. 7, 1986

[30] Foreign Application Priority Data

Jul. 5, 1985 [GB] United Kingdom ................. 8517073

[51] Int. Cl.⁴ ............................................. B29C 45/16
[52] U.S. Cl. .................................... 425/123; 264/241; 264/248; 264/250; 264/328.8; 425/234; 425/439; 425/517; 425/572; 425/576; 425/DIG. 47
[58] Field of Search ............... 264/241, 244, 248, 250, 264/255, 328.8, 328.11; 425/119, 123, 129 S, 188, 190, 234, 439, 517, 572, 574, 576, 581, 588, DIG. 47, 546

[56] References Cited

U.S. PATENT DOCUMENTS

| | | | |
|---|---|---|---|
| 4,076,565 | 2/1978 | Goodfellow | 264/248 |
| 4,345,965 | 8/1982 | Lindenmayer et al. | 425/190 |
| 4,410,478 | 10/1983 | Lindenmayer et al. | 264/248 |

FOREIGN PATENT DOCUMENTS

| | | |
|---|---|---|
| 15456 | 4/1985 | Japan . |
| 1182769 | 3/1970 | United Kingdom . |
| 1351760 | 5/1974 | United Kingdom . |
| 1477074 | 6/1977 | United Kingdom . |
| 1572099 | 7/1980 | United Kingdom . |
| 1600725 | 10/1981 | United Kingdom . |

Primary Examiner—Jay H. Woo
Assistant Examiner—Timothy W. Heitbrink
Attorney, Agent, or Firm—Holman & Stern

[57] ABSTRACT

A molding apparatus for making a plastics pipe fitting or pipe coupling by injection-molding the plastics pipe fitting or coupling body, injection-molding at least one sealing ring separately but substantially simultaneously, and bringing the body and sealing ring together directly after the molding while these components are still in a hot as-molded state, so that a direct thermal bond is formed between them comprises respective injection-molding cavities for the body and sealing ring, and a reversible support for carrying the sealing ring out of its mold and into contact with the molded body. The respective molds are opened and the components are not stripped but are brought together for bonding while still in position on respective mold members, thereby eliminating intermediate handling and ensuring that the molded components remain clean and of accurate shape and dimension as they are brought together.

16 Claims, 3 Drawing Sheets

APPARATUS FOR THE MANUFACTURE OF COMPOSITE ARTICLES USING ROTATING MOLDS

This invention relates to the manufacture of composite articles of the kind in which a first moulded component is joined to a second moulded component. In particular but not exclusively, the invention relates to the manufacture of plastics pipes, pipe couplings, and related products with elastomeric seals.

Pipes and pipe couplings made of thermoplastics materials are normally fitted with internal sealing rings of natural or synthetic rubber or similar elastomer material.

In the case of pipes, a bell end is provided at one end of the pipe, with an internal sealing ring to receive and seal against a spigot end of another pipe. In the case of pipe couplings, respective sealing rings are provided in opposite ends of a short plastics sleeve or body, to receive respective ends of a pair of plain-ended pipes.

Various methods have been proposed for holding the sealing rings in place. One method, exemplified by British Pat. No. 1182769, uses an annular locking ring or cap which is snap-fitted on the end of the pipe or coupling body and traps an outer portion of the sealing ring.

It has also been proposed to fix sealing rings by means of adhesives.

A further proposal, in British Pat. Nos. 1477074 and 1572099, is to injection mould the sealing ring in contact with the plastics pipe or sleeve, or vice versa, so as to produce an integral product.

The commonest method, at least for pipes and couplings of larger diameters, is to use a separate locking cap or ring to hold the sealing ring in place. This does however have certain practical disadvantages. First, manufacture requires individual moulding processes and equipment for the pipe or coupling body, the sealing rings, and the locking caps. Second, these have to be stocked and brought together, and then assembled in a further manufacturing step. Third, there is a small but not negligible risk that the locking cap might be dislodged during transportation or laying.

It is therefore very desirable that pipes and pipe couplings should be capable of being produced with integral sealing rings, directly and permanently united with the plastics pipe or coupling sleeve, in order to simplify manufacture and eliminate any risk of dislodgement after manufacture.

British Patent Specification No. 1600725 discloses a pipe socket assembly made by heat-bonding a sealing ring made of EPDM rubber, onto a polyolefine bell end. The proposed method of manufacture involves applying a heating ring to the respective surfaces of the previously moulded sealing ring and bell end, then withdrawing the heating ring and applying the thus heated surfaces against each other. This method is slow and inconvenient, as it involves an intermediate heating operation, and unreliable unless great care is taken to maintain or restore cleanness and condition of the surfaces to be bonded.

SUMMARY OF THE INVENTION

According to the present invention, first and second components, for example a sealing ring (or rings) and a plastics pipe or sleeve body or the like, are moulded at substantially the same time, and while still in a hot as-moulded state, are applied against each other, so that a direct thermal bond or weld is formed between the moulded components.

The invention will be described with particular reference to the manufacture of pipe coupling sleeves, but it is to be understood that the principles of the invention are applicable to the production of other composite articles, for example shaft seals composed of seal rings in plastics supports.

The method according to the invention provides for the components to be brought together very soon after moulding, with their mating surfaces still clean and perfect and with residual heat in the components which effects or assists their bonding. In general no additional heating will be needed for bonding but additional heating may be applied if needed.

By this method, plastics pipes or pipe couplings and related products can be provided with permanently bonded integral sealing rings, quickly and reliably, permitting economical mass production.

Preferably the components are not stripped from their moulds before being bonded, but their moulds are opened leaving the moulded components in place on mould members which are then moved to apply the moulded components to one another. This eliminates intermediate handling with its risk of damage and distortion of the moulded components and enables the moulded components to be brought together in minimal time; residual heat in the mould members also assists bonding and will usually eliminate any need for additional heating.

Preferably, the components are moulded simultaneously, in that the period in which one component is moulded coincides at least partly in time, with the period in which the other component is moulded. However it is possible to mould the first and second components successively provided that the respective steps of moulding the first component and moulding the second component are sufficiently close together in time, to ensure that when both moulding steps are completed, both of the moulded components are still in a clean hot as-moulded condition so that they can then be bonded directly together. In the case of components made respectively of typical plastics material and elastomer material, the delay between the completion of moulding each component, and the mutual contacting of the moulded components for effecting bonding, can be as much as about three minutes (depending on the materials and moulding conditions) without losing the ability to form an acceptable bond.

The invention can be applied advantageously to the production of articles comprising on the one hand a thermoplastics component and on the other hand an elastomer (thermoplastic or themosetting) component, but is not restricted to the use of such materials.

The materials of the sealing ring or other elastomer component and of the plastics body should be selected for suitable physical and/or chemical compatability, so as to ensure good thermal bonding or welding between them. One suitable combination is EPDM as the elastomer, with polyproplene or another polyolefine thermoplastic, but other combinations can also be used. Examples include:

ABS-SBR
Styrene-SBR
PVC-Nitrile
PAN-Nitrile
ABS-Polyacrylic rubber.

Natural rubber can be used as the elastomer provided that its properties suit the intended use of the product.

The mating surfaces of the sealing ring, and of the plastics body, may be configured to provide a mechanical key, for example by means of grooves or shoulders on on of the components, and matching recesses, rebates or steps on the other component.

It is desirable, for at least one component to have a configuration resistant to contact pressure between said component during said application of said components to one another. In a preferred embodiment the heat-bonded region of the component constituting a plastics body includes at least one surface which is radial or oblique as seen in cross-section, and which can abut on a supporting abutment (e.g. part of the mould) during the heat-bonding step, to resist the axial pressure applied to bring the components together and bond them.

The invention also provides apparatus for producing an article comprising a plastics body of annular cross section having an annular sealing ring attached to it, which apparatus comprises a first split injection mould for moulding the said body, split on a tranverse parting surface at the end of the body where the sealing ring is to be attached; a second split injection mould for moulding a sealsing ring, split on a tranverse parting surface; means for splitting the moulds after moulding, in such a way as to leave the body carried by a part of the first mould, exposing the surface to be bonded, and to leave the sealing ring carried by a part of the second mould, exposing the surface to be bonded; and means for bringing these mould parts together so as to apply to each other the thus exposed surfaces that are to be bonded to each other, so as to bond these surfaces by means of moulding heat in the body and sealing ring.

BRIEF DESCRIPTION OF THE DRAWINGS

The invention will be further described, by way of example only, with reference to the accompanying drawings in which.

DESCRIPTION OF PREFERRED EMBODIMENTS

Figure 1:
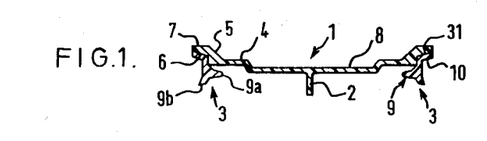
FIG. 1 is a longitudinal section through a coupling made in accordance with the invention.

The illustrated coupling consists of a symmetrical thermoplastics body or sleeve 1 with a central internal register rib 2, and an internally mounted injection-moulded elastomeric sealing ring 3 in each end, to receive respective spigot pipe ends.

The illustrated sleeve has a central cylindrical portion, and at each end of this is a region 4 of enlarged diameter or "joggle", adjoining which is an oblique external shoulder 5 leading to a stepped rim 7 with a flared internal surface 6. Except in the regions 5 and 7, the sleeve is of substantially constant wall thickness so that its internal profile matches its external profile; the thicker regions 5 and 7 provide stiffening. The joggle 4 and shoulder 5 give support to the pipes when laid, but also assist in the present method of manufacture by resisting axial forces during the step of bonding the sleeve 1 to sealing rings 3. The joggle 4 and/or shoulder 5 may be omitted provided that some form of external abutment surface is present on the sleeve.

Each sealing ring 3 has a sealing head 9 of generally triangular lobed cross section, one corner of which merges with a stepped flared flange 10 of a shape matching the flared internal surface 6 of the sleeve 1, with the step of the flange 10 seated in the internal step of the sleeve profile formed by the shoulder 5.

The flange 10 is heat-bonded or welded to the flared internal surface 6 of the sleeve, leaving the generally triangular sealing head 9 free to flex within the joggled region 4 of the coupling sleeve, to accommodate an inserted pipe end and allow for misalignment and dimensional tolerances of the pipe end while providing a reliable seal against it. The heat 9 has a rounded lobe 9a and an inner tapered lip 9b. When a pipe end is inserted it deflects the head 9 so that lobe 9a is pressed against the internal surface of the sleeve 1 and the lip 9b presses sealingly against the pipe surface.

The sealing rings 3 are heat-bonded or welded into the ends of the coupling sleeve, so that the coupling as a whole is a single unitary article, in contrast to commonly available pipe couplings in which the sealing rings are separate components held in place by locking caps which are also separate components. This conventional type of coupling is inconvenient to manufacture owing to the need to provide five separately manufactured components and the ensure that these match one another accurately and are correctly assembled together; this necessitates extremely close control of moulding tolerances, which is notoriously difficult in the case of moulded rubber products; furthermore the sealing rings, being necessarily flexible, may also become tangled or damaged when being handled or transferred between the moulding step and their assembly into the finished coupling.

These disadvantages are eliminated by the present invention, which provides a method and apparatus whereby only three components are required to form a pipe coupling, and these components can be moulded simultaneously in a common moulding machine, their dimensions, tolerances, and positions being very accurately controlled as they are made and brought together.

Figure 2:
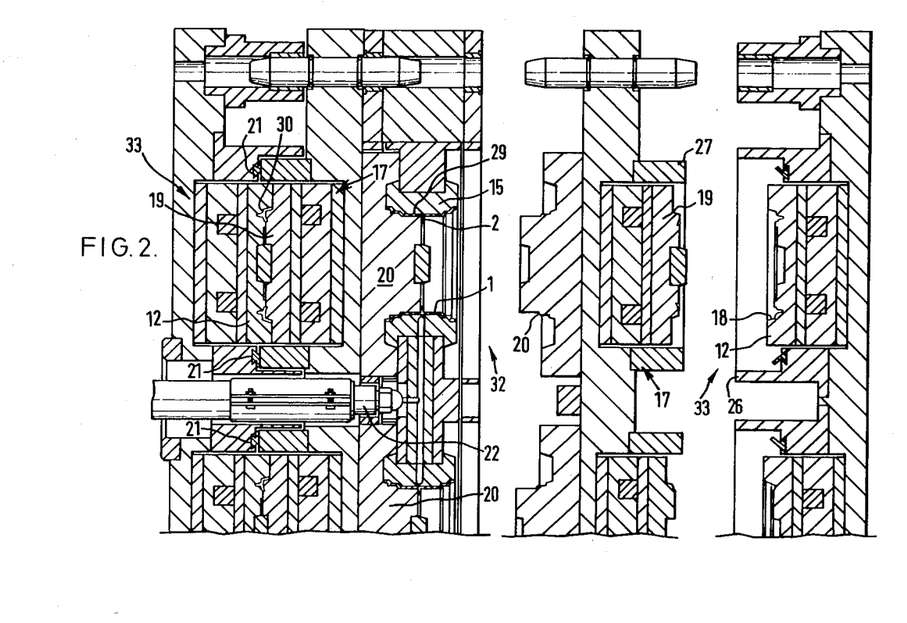
FIG. 2 is a side view in section of mould tooling for performing the invention, showing on the right mould tools open prior to moulding the components of the coupling and on the left mould tools closed for moulding the components.
Figure 3:
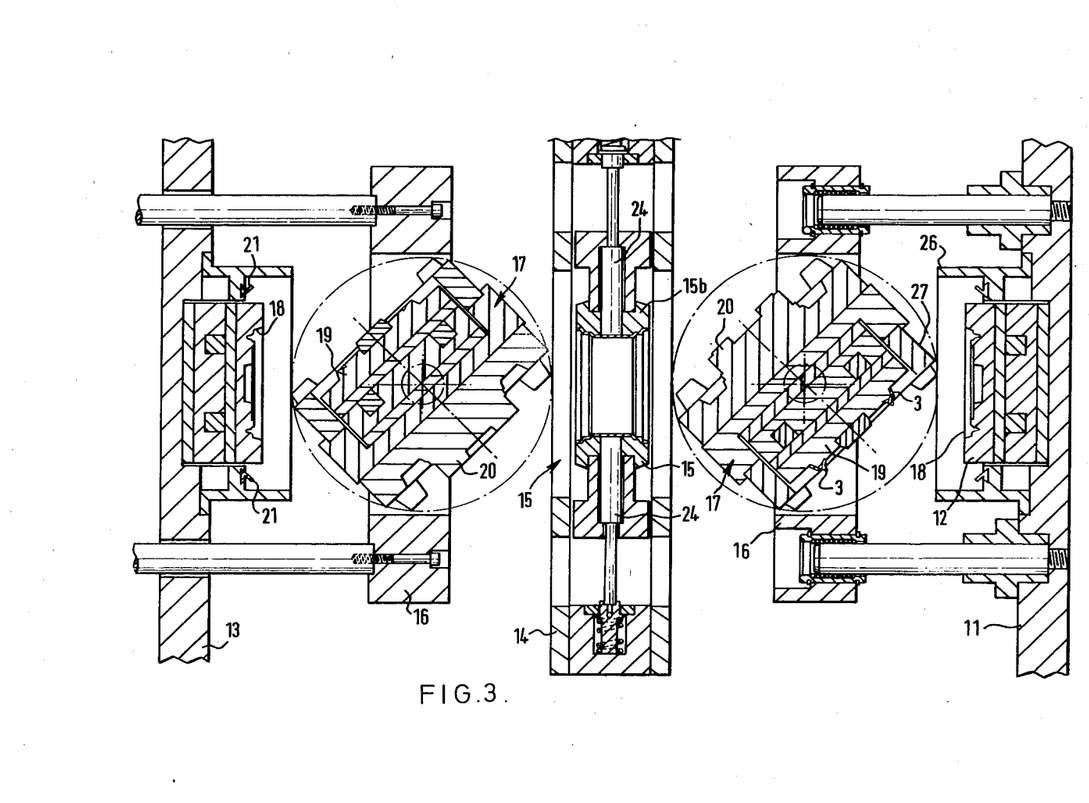
FIG. 3 is a plan view in section of the mould tooling showing mould core blocks open and partly swivelled.
Figure 4:
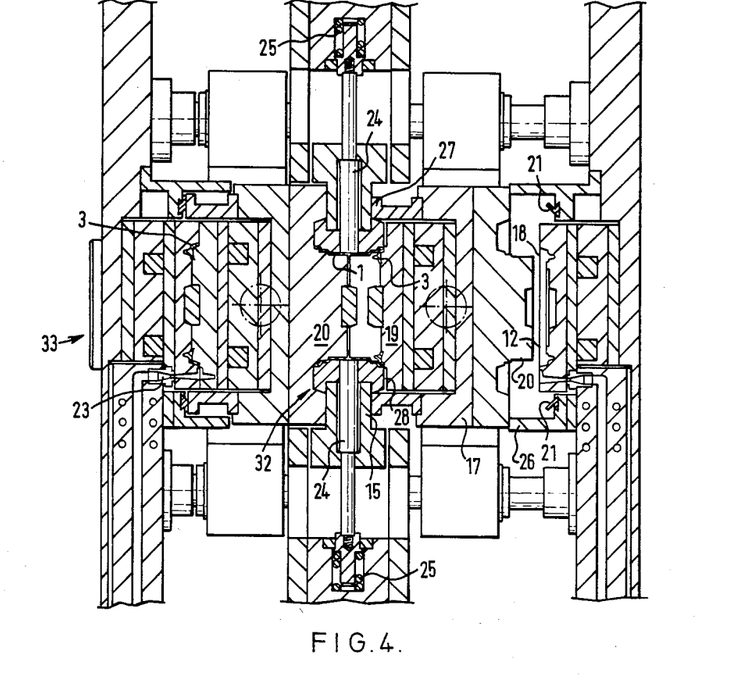
FIG. 4 is a plan view in section of the mould tooling, showing on the left mould tools closed for moulding, and on the right, mould tools in position for bonding the moulded components, after opening, swivelling as in FIG. 3, and reclosing of the tools.

FIGS. 2 to 4 illustrate a moulding and bonding process for making the plastics coupling sleeve and synthetic rubber sealing rings and joining them together, and one possible form of apparatus for producing unitary pipe couplings according to the invention.

The illustrated apparatus is a two-impression two-daylight injection moulding press with special tooling, and is suitable for the production of 4" and 6" (10 cm and 15 cm) pipe couplings. For producing larger couplings, a press of similar layout would be used, but with single impression instead of two impressions.

The drawings show only the moulding tools and associated press components. Other press components such as injection mechanisms for rubber and plastics, hydraulic operating cylinders for opening and closing the mould tooling, guide dowel pins, tool position control racks and so on, are not illustrated or are not described in detail, being well known or obvious to injection moulding equipment designers.

The illustrated injection moulding apparatus comprises a stationary platen 11 (FIG. 3) carrying a first sealing ring mould block 12. Spaced from and opposite the stationary platen 11, a moving platen 13 carries an identical second sealing ring mould block 12. Mid-way between the sealing ring mould blocks 12, a moving crosshead 14 carries a radially split mould 15 for moulding the outer profile of the plastics coupling sleeve 1. The moving cross head is connected to the stationary platen and to the moving platen by coarse-pitch lead screws and nuts so arranged that, when the moving platen moves relative to the stationary platen, the moving cross head 14 is always accurately centered between the platens 11, 13. Alternatively the platens and cross head may be interconnected by pinions and toothed racks so arranged that, when the moving platen moves, the moving cross head is always accurately centered between the platens. The moving platen is moved by hydraulic cylinders.

Between each platen 11 or 13 and the moving cross head 14, is a respective core support plate 16, which carries a respective double-sided core block 17 which can be swivelled; in the illustrated case the core block 17 can be swivelled through 180° about a vertical axis which intersects and is perpendicular to the longitudinal centre line of the mould blocks 12 and split sleeve mould 15.

Each seal mould block 12 has an internal mould profile 18 corresponding to the external profile of a sealing ring 3, including the lobe 9a.

The sleeve mould 15 consist of first and second split mould halves 15a, 15b which meet on a longitudinal median plane and together have an internal profile corresponding to the external profile of the plastics coupling sleeve 1.

Each core block 17 has on one side a seal ring core 19 with an external profile corresponding to the internal profile of a sealing ring within the flange 10. On the opposite side of the core block 17 is a sleeve core 20 with an external profile corresponding to the internal profile of one end half of the plastics coupling sleeve, with the division coinciding with one face of the register rib 2.

All press operations are performed symmetrically with respect to the central moving cross head 14.

The relative positions of the tool parts at the beginning of a coupling production cycle are as shown at the right hand side of FIG. 2. That is, the sealing ring mould block 12, core block 17, and sleeve mould 15 are axially in line but spaced from one another, with the sleeve core 20 of the core block facing the sleeve mould 15, the sealing ring core 19 facing the sealing ring mould 18, and the sleeve mould parts 15a, 15b closed together.

Next the mould blocks and core blocks are moved axially together into the moulding positions shown in the left hand sides of FIGS. 2 and 4. In the moulding position, the sleeve cores 20 enter opposite sides of the sleeve mould 15, and abut axially on one another and on the faces of the sleeve mould, so as to define with the sleeve mould a first mould 32 having a mould cavity 29 for moulding the plastics coupling sleeve 1.

Simultaneously, the sealing ring cores 19 mate with the sealing ring mould profiles 18 to define a pair of respective second moulds 33 with moulding cavities 30 for moulding the synthetic rubber sealing rings 3, these moulds being sealed by vacuum seals 21.

As can be seen in FIG. 2, there are two sets of mould tooling, disposed one above the other. Plastics material, for example polyethylene or polypropylene, is injected into the sleeve mould cavity through a centrally disposed nozzle 22, so as to form a pair of injection moulded plastics sleeves in the respective mould cavities.

Simultaneously, synthetic rubber compound is injected into the sealing ring mould cavities for example through nozzles 23 as shown in FIG. 4, so as to form respective pairs of rubber sealing rings.

The tooling is then opened by axial movement of the moving platen 13, moving crosshead 14 and plates 16 with core blocks 17, returning to the relative positions shown on the right of FIG. 2. At this stage the injection moulded plastics sleeve 1 remains held in the sleeve mould 15, and the injection moulded rubber sealing rings 3 remain seated on the cores 19.

It will be seen that the injection mould 32 formed by mould member 15 and core 20 is split on a transverse porting surface which coincides with the end of the sleeve, so that when the mould 32 is opened the end and internal joint surface 6 of the moulded sleeve is exposed.

The injection mould 33 for the sealing ring is split on a transverse parting surface which coincides with the outer end of the sealing ring so that when the mould 33 is opened, the end and external joint surface 31 of the sealing ring flange 10 is exposed.

The core blocks 17 are then swivelled 180° (see FIG. 3) so that the sealing rings 3, held on their cores 19, now face respective ends of the plastics sleeve 1 held in the sleeve mould 15. The press platens are then again brought together as shown on the right hand side of FIG. 4, so that the sealing ring cores carrying the sealing rings 3 are brought into opposite ends of the sleeve mould 15, thereby pressing the tapered outside surfaces 31 of the sealing ring flanges 10 into contact with the flared internal surfaces 6 of the plastics sleeve, under controlled axial contact pressure.

The sealing rings and sleeve are thus brought into contact with one another very shortly after being moulded. Typically the delay between opening of the moulds and the contacting of the sealing rings with the sleeve is of the order of 3–10 seconds. At this time, they are still hot from moulding, very clean and free from surface oxidation. The abutting surfaces of the sealing rings and sleeve therefore bond readily to one another under the influence of the residual heat and the pressure applied by the press. They are held in this position long enough for reliable heat bonding or welding between the sealing rings and plastics sleeve, typically a few seconds.

The platens are then moved apart, retracting the core blocks from the sleeve mould 15 and leaving the completed coupling, consisting of the sleeve mould and bonded sealing rings, held between the opposite parts of the sleeve mould 15. The sleeve mould parts 15a, 15b are then moved laterally apart to positions clear of the moulded coupling. During this movement, the coupling is held in position by pins 24 which are mounted in the sleeve mould parts with lost motion. As the sleeve mould parts approach their fully retracted positions, they entrain the respective pins 24 against the action of springs 25, thereby retracting the pins and allowing the completed couplings to drop clear.

To return the press to its initial condition ready for another coupling production cycle, the core blocks 17 are swivelled back 180° to their original positions, and the sleeve mould parts 15a, 15b are moved together again. The press is then ready for the next production cycle.

Suitable operating and driving means are provided for axially moving the platen 13, crosshead 14 and core support plates 16 for closing and opening the moulds 32, 33, and for swivelling the plates 16. These operating and driving means are of a kind well known to those skilled in the art and therefore are omitted from the drawings for clarity. They may for example be hydraulic or pneumatic cylinders.

The materials used for moulding the coupling sleeve and sealing rings can be selected to suit the operating requirements of the finished coupling. Similarly, the shapes of the coupling sleeve and sealing rings can be selected for particular applications and conditions of use.

The illustrated coupling is intended for use with underground drainage pipes of clayware or other mineral composition. For such use, the sealing ring head must be capable of accommodating pipes of relatively poor tolerance and surface finish and of resisting movements after installation. A relatively large sealing head is therefore required, and the rubber used must be consistent and have good resistance to creep or compression set. Natural rubber is unsuitable for such conditions, and currently available thermoplastic rubbers (which would have advantages in production) do not have suitable properties particularly as regards creep resistance. We therefore presently envisage the use of synthetic thermosetting rubbers, in particular SBR, EPDM and nitrile formulations.

These are moulded in heated moulds. As a result, there are necessarily temperature differences within the press. The sleeve mould 15 and core 20 are relatively cold, for injection moulding of the thermoplastic sleeve, whereas the sealing ring moulds 12 and cores 19 are hot for curing the thermosetting rubber.

When the core blocks 17 are swivelled to reverse the relative positions of the sleeve core 20 and sealing ring core 19, the hot sealing ring core 19 comes into proximity with the cold sleeve mould 15 and conversely the cold sleeve core 20 comes into proximity with the hot sealing ring mould 12. To avoid problems which would arise due to contact between mould tools at different temperatures, the sealing ring mould block 12 is provided with secondary abutments 26 maintained at a lower temperature, so that when the mould tooling is re-closed in the bonding position shown on the right of FIG. 4, the abutments 26 meet opposed faces on the core block 17, adjacent to the sleeve core 20, so as to maintain an air gap as thermal isolation between the sleeve core and the sealing ring mould 18. Similarly, the core block 17 has, adjacent to the sealing ring core 19, secondary abutments 27 which mate with surfaces of the sleeve core and are maintained at a lower temperature than the sealing ring core, these secondary abutments being arranged so that a heat-insulating air gap 28 is maintained between the sealing ring side of the core block and the opposed surface of the sleeve core 15. These secondary abutments 27 also control the degree of closing of the sealing ring core against the sleeve mould 15, and thereby limit deformation and extrusion of the rubber and plastics materials during bonding of these. It is to be understood that, since the sealing rings and sleeve are bonded together under pressure while still hot, there will inevitably be some flow of at least one of the components being bonded, and this needs to be limited, to ensure accurate shape and dimensions of the finished coupling. The rim 7 of the plastics coupling sleeve may project slightly beyond the end of the sealing ring flange 10 so that extrusion can take place at the end of the rim and flange where it will least affect the performance of the coupling.

Control of the rubber formulation, and accurate mould design, ensure that the sealing rings can be moulded without flash and will remain in position on the core 19 after moulding. Control of the composition also enables the sealing rings to be moulded with a short cycle time, about 40 seconds for a 4″ (10 cm) coupling. The moulding time for the plastics sleeve is typically about 20 seconds for typical conventional sleeve thicknesses, so that it is possible to enhance sleeve strength by providing thicker regions and allowing a corresponding slightly longer moulding time, within the overall time constraint imposed by the rubber moulding time.

The short cycle times, and the fact that the sealing rings and sleeve are moulded simultaneously, and are brought into engagement only a matter of seconds after opening of their respective moulds and without being removed from respective mould tools 15, 19, ensure that the mating surfaces of the sealing rings and plastics sleeve are enabled to bond to one another under optimum conditions, while still hot and in the "as moulded" condition, before they have any change to acquire surface oxidation or dirt or otherwise deteriorate. A single-piece coupling is thus produced in a single moulding-/bonding cycle, with no secondary operations such as stripping components, trimming flash or re-heating.

Furthermore, the rubber moulding cycle can be shorter than is usual, that is to say the rubber sealing ring mould cavities can be opened early, because the rings remain after opening on the hot cores 19 and therefore curing can continue after mould opening. This contributes further to speed of production and to good bonding with the plastics sleeve. Because the components remain located in or on respective moulding tools 15, 19 when being transferred from their moulding positions to the bonding position and during bonding, all intermediate handling of components is eliminated, and accurate alignment of the sealing rings with the sleeve is guaranteed. This is a major advantage compared with all conventional coupling production processes, in which the rubber sealing rings are moulded separately and then have to be aligned with the plastics sleeve.

The moulding cycle times, temperatures and pressures in the various stages of the moulding and bonding process, are selected and controlled according to the materials used.

The conical configuration of the sealing ring flange 10 and the flare 6 of the sleeve enhance the interfacial pressure during bonding while providing a large bonding surface. Instead of the simple conical surfaces illustrated, the flange 10 and flare 6 may have a series of steps of progressively increasing diameter.

The step 5 on the outside of the sleeve has the important function of resisting axial displacement under the axial pressure exerted during the bonding step. More than on such external step may be provided on the sleeve. Since the function of this step is to resist axial displacement of the sleeve material, it is not essential that there should be a corresponding internal step in the sleeve as illustrated in FIG. 1, however one would normally provide a matching internal step.

The radial end of the joggle 4 also helps to resist axial displacement.

The thicker regions of the sleeve between the joggle 4 and the sleeve end provide hoop strength at the sealing position, to ensure enough sealing force and creep resistance. The resulting increase in the plastics moulding cycle time, due to the extra sleeve wall thickness, is tolerable, as it can still be within the overall constraint imposed by the longer rubber moulding cycle time. Instead of or in addition to the thickening in regions 5, 7, the sleeve may have external peripheral stiffening ribs in the region of the sealing ring head 9.

The external step or steps 5 and the tapered configuration of the sleeve and sealing ring flange are particularly valuable features of the illustrated coupling for reasons already mentioned. The long tapered configuration of the components at 6 and 10 also enables the sealing head 9 to be located sufficiently far inside the coupling sleeve, to prevent the sealing head from being pulled from the sleeve if a pipe is inserted and then partly withdrawn.

Other valuable features of the illustrated coupling design are:

the sleeve is stiff adjacent the sealing head by virtue of the ribs or thickening in this region, but is flexible at the ends to facilitate insertion of pipes, the shape of the sleeve prevents the sealing head from being pushed into the sleeve ahead of an inserted pipe end, the sealing head is of modified triangular form (alternatively triangular, circular, or a modified circular form) and has ample capacity to flex, ensuring that the minimum dimension of the seal is always sufficient and that pipe tolerances and movements can be accommodated.

It will be apparent to the skilled reader that many other mould tooling configurations could be designed to produce a similar result namely moulding and bonding within a single machine cycle, without dismounting of the moulded components between moulding and bonding. For example different motions can be provided to reverse the core blocks. Instead of reversible core blocks, the tooling may comprise sealing ring cores on the platens, facing the sleeve mould, with intervening tooling comprising sleeve cores and sealding ring outer moulds which are removed bodily from between the sealing ring cores and sleeve mould, leaving the sealing rings seated on the platen-mounted cores which are then brought together with the moulded sleeve in its central mould. However this inevitably increases the amplitude of movement of the mould tooling, which is inconvenient.

The illustrated machine design has the advantages of being very compact, and of maintaining all the pressures required for moulding and bonding substantially in a single line in the press, which simplifies press design and enhances stability and accuracy. Having the reversible core blocks rotatable about vertical axes eliminates problems due to out of balance core block shapes.

Although the invention has been described in relation to the production of symmetrical double-ended coupling sleeves, substantially the same moulding process and tooling configuration can be used to produce other components. For example it is not essential that the coupling produced be symmetrical. To produce asymmetrical couplings or adaptors, opposite sides of the sleeve mould 15, and the respective core blocks and sealing ring moulds, can be made of respective different sizes, for example 4" (10 cm) on one side of the sleeve mould and 6" (15 cm) on the opposite side. Similarly, a single-sided tooling configuration (that is to say, only a single core block disposed between a sealing ring mould and a mould for a plastics component) can be used to manufacture other one-piece products such as blanking-off caps provided with single sealing rings.

In relation to the production of one-piece products, the process and apparatus according to the present invention have significant advantages over apparatus proposed previously (GB Nos. 1572099, 1477074) for the integral injection moulding of one-piece couplings in which the plastics sleeve is injection moulded in direct contact with the sealing rings, or vice versa. Specifically, injection moulding one component onto the other effectively requires dedicated tooling and presses, which cannot readily be adapted to produce different products, or even products of similar configuration but different diameters. The present process and apparatus however are versatile and flexible. As will be readily understood, products of different diameters, or even different design, can be produced in the same press, simply by substituting different mould and core profiles in the respective moulds and the core blocks. This can be done relatively easily and quickly.

It is to be understood that the production of composite articles by thermal bonding or welding is well known. However, hitherto such articles have normally been made of similar materials, usually thermoplastics, so that the formation of a heat bond is relatively straight forward. In the case of pipe couplings, and related products, the components are made of very different materials, in particular thermoplastics material and thermosetting rubbers. The formation of a reliable bond is therefore problematic, especially if the products are made in the conventional way using pre-moulded components. The present invention enables reliable bonds to be formed quickly and accurately despite the dissimilarity and relative incompatability of the rubber and plastics material used, owing to the rapidity with which the components can be brought together immediately after being moulded.

We claim:

1. Apparatus for producing a pipe fitting having a first component in the form of an annular body of thermoplastic material and a second component in the form of a seal ring of elastomer material bonded to the annular body at an end thereof, the apparatus comprising:

a first outer mold member;

a second outer mold member;

means for moving said mold members towards and away from one another along a mold axis thereof;

an intermediate support member disposed between said mold members;

a first face on said intermediate support member;

a first inner mold profile on said first face complementary to said first outer mold member for forming therewith a first mold cavity for molding said annular body;

a second face on said intermediate support member on a side thereof opposite from said first face;

a second inner mold profile on said second face complementary to said second outer mold member for forming therewith a second mold cavity for molding said seal ring;

said support member being rotatable about an axis of rotation perpendicular to said mold axis selectively to a first rotary position in which said first inner mold profile faces said first outer mold and said second inner mold profile faces said second outer mold, and to a second rotary position in which said first inner mold profile faces said second outer mold and said second inner mold profile faces said first outer mold;

means for rotating said support member;

means for separately injecting thermoplastic material into said first mold cavity and for injecting elastomer material into said second mold cavity;

said mold cavities being designed so that on axial separation of said mold members from said support after said injecting, one of said components will remain in position on the respective associated one of said mold members and the other of said components will remain in position on the respective associated one of said mold profiles;

means for heating said second mold cavity;

control means for effecting an operating cycle comprising (a) disposing said mold members in contact with said support member with the support member in said first rotary position, (b) injecting said thermoplastic material into said first mold cavity and substantially simultaneously injecting said elastomer material into said second mold cavity while heating said second mold cavity, (c) separating said mold members from said support member, (d) rotating said support member with said other of said components thereon through 180° about said axis of rotation, (e) moving together said one of said mold members with said one component thereon, and said support member with said other component thereon for thereby bonding together said components by means of molding heat retained in said components to form said pipe fitting, and (f) separating said mold member and support member for removing said pipe fitting; and means provided on at least one of said outer mold members and said support member adjacent said one of said mold profiles for maintaining a thermal barrier between said support member and said one mold member during said bonding.

2. The apparatus as claimed in claim 1 wherein:
said first mold cavity has a stepped profile including a transverse step for molding a corresponding abutment on said annular body for resisting contact pressure applied to the annular body and sealing ring during the bonding thereof.

3. The apparatus as claimed in claim 1 wherein:
said means maintaining said thermal barrier comprise abutment means provided adjacent said second mold cavity on at least one of said first mold member and said support member and adapted to remain at a lower temperature than said second mold cavity.

4. The apparatus as claimed in claim 1 and further comprising:
means for maintaining a thermal barrier between the other of said outer mold members and said support member during bonding.

5. The apparatus as claimed in claim 1 and further comprising:
means for maintaining a thermal barrier between the other of said outer mold members and said support member during bonding comprising abutment means provided adjacent said second mold cavity on at least one of said second mold member and said support member and adapted to remain at a lower temperature than said second mold cavity.

6. The apparatus as claimed in claim 1 wherein:
said mold axis is horizontal and each said axis of rotation is vertical.

7. The apparatus as claimed in claim 5 wherein:
said mold axis is horizontal and each said axis of rotation is vertical.

8. Molding apparatus for producing a pipe coupling including a first component in the form of a tubular plastics sleeve and two second components each comprising a respective elastomer seal ring bonded to said sleeve at a respective end of the sleeve, said apparatus comprising:

means defining a mold axis;

a double-sided central mold member on said axis;

first and second outer mold members respectively on said mold axis at each side of said central mold member;

a respective support member on said mold axis between each said outer mold member and said central mold member;

means for moving said mold members and support members towards and away from one another along said axis between a mold closed condition and a mold open condition;

each said support member being rotatable about an axis of rotation perpendicular to said mold axis selectively to a molding position and a bonding position 180° apart;

means for rotating said support members;

an internal mold profile on said central mold member for molding the outer surface of said sleeve and having two opposite open ends facing said support members respectively;

a first face on each said support member;

a core on each first face complementary to said internal mold profile and adapted to define therewith, when said support member is rotated into its molding position and in said mold closed condition, a sleeve mold cavity between said internal mold profile and both said cores;

means for injecting thermoplastic material into said sleeve mold cavity to form said plastics sleeve;

a second face on each said support member on the side opposite said first face;

a first seal mold profile on said second face;

a face on each said outer mold member facing the adjacent support member;

a second seal mold profile on said outer mold member face complementary to said first seal mold profile and adapted to define therewith, when said support member is rotated into it molding position and in said mold closed condition, a respective seal mold cavity between said first and second seal mold profiles;

means for injecting elastomeric material into said seal mold cavities substantially simultaneously with said injection of thermoplastic material into said sleeve cavity;

said mold cavities being designed so that on axial separation of said members to the mold open condition said molded sleeve will remain in said central mold member with the ends of said sleeve exposed, and said molded seal rings will remain in place on said second faces of said support members respectively;

means for heating said seal mold cavities; and control means for rotating said support members with said seal rings thereon 180° to said bonding position so that each said seal ring faces and is aligned with a respective exposed end of said sleeve in said central mold member, and for moving said mold members and support members axially towards one another to bring said seal rings into contact with said exposed sleeve ends for bonding said seal rings to said sleeve ends by means of molding heat retained therein to form said pipe coupling.

9. The apparatus as claimed in claim 8 and further comprising:

means associated with each said seal mold cavity for maintaining thermal barriers between said support members and said central mold member during bonding.

10. The molding apparatus as claimed in claim 9 wherein:

said means for maintaining thermal barriers comprise respective abutment means on said support members around said first seal mold profiles maintained at a temperature lower than said seal mold cavities and adapted to maintain respective air gaps between said second faces of said support members and said central mold member when said members are brought together in said mold closed condition and bonding position.

11. The molding apparatus as claimed in claim 9 and further comprising:

means for maintaining further thermal barriers respectively between said support members and said outer mold members during bonding.

12. The apparatus as claimed in claim 11 wherein:

said means for maintaining said further thermal barriers comprise respective abutment means on said outer mold members around said second seal mold profiles maintained at a temperature lower than said seal mold cavities and adapted to maintain respective air gaps between said outer mold members and said first faces of said support members when said members are brought axially together in said mold closed condition and bonding position.

13. The apparatus as claimed in claim 8 wherein:

said sleeve mold cavity has at each end thereof a stepped profile comprising a transverse step for molding a corresponding abutment on said sleeve for resisting contact pressure applied to the sleeve and sealing ring during bonding thereof.

14. The apparatus as claimed in claim 13 wherein:

said seal mold cavity has a transverse surface on the profile thereof for molding on said seal ring a corresponding transverse surface for engaging said abutment on said sleeve.

15. The apparatus as claimed in claim 8 wherein:

said mold axis is horizontal and each said axis of rotation is vertical.

16. The apparatus as claimed in claim 14 wherein:

said mold axis is horizontal and each said axis of rotation is vertical.

* * * * *